United States Patent
Park et al.

[11] Patent Number: 6,124,918
[45] Date of Patent: Sep. 26, 2000

[54] METHOD OF MANUFACTURING PLASMA DISPLAY PANEL

[75] Inventors: Joo-sang Park, Suwon; Du-hyeon Noh, Seoul; Si-hyun Lee, Suwon, all of Rep. of Korea

[73] Assignee: Samsung Display Devices, Co., Ltd., Kyungki-Do, Rep. of Korea

[21] Appl. No.: 09/389,298

[22] Filed: Sep. 2, 1999

Related U.S. Application Data

[62] Division of application No. 08/921,326, Aug. 29, 1997.

[30] Foreign Application Priority Data

Aug. 31, 1996 [KR] Rep. of Korea ............ 96-37668
Aug. 31, 1996 [KR] Rep. of Korea ............ 96-377677
Sep. 2, 1996 [KR] Rep. of Korea ............ 96-41381

[51] Int. Cl.$^7$ .................. G02F 1/1339; H01J 17/49; H01J 9/00
[52] U.S. Cl. .................. 349/155; 349/156; 313/586; 313/587; 445/23; 445/24
[58] Field of Search .................. 349/155, 153, 349/156, 190; 313/586, 587, 581, 582, 584, 585; 445/23, 24, 25

[56] References Cited

U.S. PATENT DOCUMENTS

| | | | |
|---|---|---|---|
| 3,787,210 | 1/1974 | Roberts | 96/27 E |
| 4,315,668 | 2/1982 | Aftergut et al. | 350/343 |
| 4,568,149 | 2/1986 | Sugata et al. | 350/334 |
| 4,796,038 | 1/1989 | Allen et al. | 354/4 |
| 5,171,650 | 12/1992 | Ellis et al. | 430/20 |
| 5,308,737 | 5/1994 | Bills et al. | 430/201 |
| 5,326,619 | 7/1994 | Dower et al. | 428/164 |
| 5,541,479 | 7/1996 | Nagakubo | 313/586 |
| 5,593,802 | 1/1997 | Sato et al. | 430/20 |
| 5,781,258 | 7/1998 | Dabral et al. | 349/73 |
| 5,907,381 | 5/1999 | Komachi | 349/156 |
| 5,909,261 | 6/1999 | Seki et al. | 349/32 |
| 5,936,694 | 8/1999 | Suzuki et al. | 349/151 |

FOREIGN PATENT DOCUMENTS

| | | |
|---|---|---|
| 0649046 | 4/1995 | European Pat. Off. . |
| 56-42212 | 4/1981 | Japan . |
| 4-9011 | 1/1992 | Japan . |
| 3184022 | 8/1992 | Japan . |
| 6150824 | 5/1994 | Japan . |
| 7152038 | 6/1995 | Japan . |
| 97/50016 | 12/1997 | WIPO . |
| WO9750016 | 12/1997 | WIPO . |

*Primary Examiner*—Kenneth Parker
*Assistant Examiner*—Mike Qi
*Attorney, Agent, or Firm*—Leydig, Voit & Mayer, Ltd.

[57] ABSTRACT

A flat-panel display device, particularly, a liquid crystal display (LCD) and a plasma display panel (PDP), and manufacturing methods therefor are provided. To form spacers or barrier walls which locate between upper and lower substrates of the LCD or PDP to maintain the gap between two substrates to a predetermined distance, a laser transcription method is used. That is, a donor film including a base film, a light absorption layer and a transcription layer is put on the lower substrate of the LCD, in which a transparent substrate, a transparent electrode and an alignment layer are stacked in sequence, or on the lower substrate of the PDP, in which a transparent substrate, an address electrode and a dielectric layer are stacked in sequence, and then a laser beam is transcribed thereonto to form the spacers or barrier walls having uniform height and width. Therefore, the interval between two substrates is uniform, so that display characteristics can be enhanced through a simple manufacturing process.

4 Claims, 4 Drawing Sheets

METHOD OF MANUFACTURING PLASMA DISPLAY PANEL

This disclosure is a division of patent application Ser. No. 08/921,326, filed on Aug. 29, 1997.

BACKGROUND OF THE INVENTION

The present invention relates to a flat-panel display device, and more particularly, to a flat-panel display device and manufacturing method therefor, in which display characteristics are improved by maintaining a uniform cell gap between upper and lower substrates.

Cathode ray tubes (CRT), and flat-panel display devices such as liquid crystal displays (LCD), plasma displays (PDP), electro-luminescent displays (ELD), field emission devices (FED), and light emitting diodes (LED) are currently used as picture display devices.

The CRT has excellent picture quality and brightness compared to other devices. However, the volume and weight of the CRT are great, so that it is difficult to use for a large screen display.

On the contrary, the flat-panel display device is now widely used due to its light weight and small volume. Also, research into the flat-panel display device as a display for the next generation has been actively performed.

Particularly, the LCD is a display device using peculiar properties of liquid crystals. The liquid crystal material is advantageous in handling and has a characteristic in which the alignment of the liquid crystals is changed according to the application of an external electrical field. Thus, liquid crystal materials are widely used in ferroelectric liquid crystal display devices (FLCD), twisted nematic LCDs (TN-LCD), thin film transistor LCDs (TFT-LCD), and plastic LCDs.

FIG. 1 is a sectional view showing the structure of a conventional LCD. First, indium tin oxide (ITO) electrodes 12 and 12' and, alignment layers 13 and 13' are sequentially stacked on the transparent substrates 11 and 11', respectively, to form first and second substrates 10 and 10'. Then, a spacer 14 is scattered between the alignment layers 13 and 13' of the first and second substrates 10 and 10'. Then, the first and second substrates 10 and 10' are sealed using sealant 16, resulting in a cell gap therebetween. Lastly, liquid crystal material is inserted into the cell gap to form a liquid crystal layer 15.

In the LCD having the above structure the alignment of the liquid crystals is changed by the application of an external voltage, and thus the light incident on the liquid crystal layer is blocked or transmitted. That is, when an electrical field is formed in the liquid crystal layer by applying a voltage to the transparent electrode, the liquid crystals are aligned in a predetermined direction, and thus the light incident on the liquid crystal layer is blocked or transmitted according to the alignment pattern of the liquid crystals. Such driving characteristics of the liquid crystals are largely influenced by the interval of the liquid crystal cell gap of the LCD. That is, since the physico-chemical reaction of the liquid crystals is determined according to the intensity of the applied voltage and the distance between the two electrodes, the physico-chemical reaction of the liquid crystals with respect to the voltage are changed and the transmittance ratio is not uniform if the thickness of the liquid crystal layer is not uniform. Thus, it is very important to maintain the interval of the cell gap in the LCD at a predetermined distance for obtaining a liquid crystal layer having a uniform thickness in manufacturing the LCD.

However, in a conventional LCD, circular or cylindrical spacers having larger diameters than the interval of the intended cell gap are scattered on the alignment layer of one of two substrates on which a transparent substrate, a transparent electrode and an alignment layer are sequentially deposited. Then, the other substrate is put on the substrate such that the alignment layers of two substrates face each other, and then a sealant as an adhesive material is applied at the edges of the two substrates. Therefore, the two substrates are sealed under pressure while applying heat or irradiation with ultraviolet rays, forming a cell gap.

However, if the interval of the cell gap is controlled by the above manner, various problems occur. First, since spacers are scattered irregularly, they may be partially agglomerated, resulting in a deviation in the interval of the cell gap. Further, the diameters of the spacers are non-uniform, so that it is difficult to control the interval of the cell gap. Also, since the spacers are not fixed within the cell gap, they flow during the injection of the liquid crystal material. Accordingly, the alignment layer may be damaged. Further, the electrodes may be damaged by the spacers when two substrates are sealed under pressure. Thus, the resultant LCD does not have good light blocking and transmittance characteristics.

To solve the above problems, a spacer formation method using a photolithography technique has been suggested. According to this method, a photosensitive material is deposited on the substrate to form a photosensitive layer, and then the photosensitive layer is exposed to light and developed, resulting in spacers having the intended pattern. However, this method may cause damage to the alignment layer.

On the other hand, a color LCD includes a first substrate including red, green and blue color filters as three principal colors of light, a second substrate including an active circuit portion with a thin film transistor, and a liquid crystal layer between two substrates.

FIGS. 2 and 3 show the structure of the first substrate including a color filter layer in a color LCD. The process of forming the first substrate will now be described. First, a light shielding black matrix 22a (see FIG. 2) is formed on a transparent substrate 21. Next, a photosensitive acryl resin including a dye with a spectroscopic property of red is deposited on the entire surface of the substrate 21, and then a red filter 23 is formed through baking, light-exposure and developing processes. A green filter 24 and a blue filter 25 are formed in the same manner as that of the red filter 23, thereby resulting in a color filter 20. The color filter may be in the form of strips, dots, or a mosaic.

FIG. 3 shows a substrate in which a black matrix 22b is formed after the step of forming a color filter layer 20.

Then, a protective film 26 may be formed of a transparent resin having strong surface hardness and excellent light transmittance in order to protect the black matrix 22a or 22b and the color filter layer 20 from external impact.

Next, a transparent electrode layer 27 for driving the liquid crystal is formed and then an alignment layer 28 is formed on the transparent electrode layer 27, completing the first substrate.

In the color filter of the LCD manufactured according to the above process, three wavelengths of light emitted from a fluorescent lamp pass a filter layer for selectively transmitting only a predetermined wavelength of light via a liquid crystal panel which is opened or closed by an electrical signal, so that a predetermined color (image) is achieved.

On the other hand, the plasma display panel displays an image using a gas discharging phenomenon, which is excellent in display capacity, luminance, and contrast. Also, there is little afterimage and the viewing angle is wide. Thus, the plasma display panel attracts attention as a next generation display device.

Generally, the plasma display panel is manufactured by the following steps: first, two transparent substrates made of a transparent material such as glass are prepared. On one of the transparent substrates, a transparent electrode in a stripe shape with a predetermined interval, a bus electrode in a stripe shape whose width is narrower than that of the transparent electrode, and a dielectric layer covering both the transparent electrode and the bus electrode are formed sequentially to complete a front substrate. On the other transparent substrate, an address electrode in a stripe shape which is orthogonal to that of the transparent electrode and a dielectric layer covering the address electrode are sequentially formed to complete a rear substrate. Also, barrier walls for maintaining a gap between two substrates to a predetermined level is formed between two dielectric layers of the front and rear substrates.

In a conventional plasma display panel, the barrier walls are formed by repeating a screen printing process several times until the height of the barrier wall reaches a predetermined level. However, the height of the barrier wall obtained by this method is not even, so that the cell gap between the upper and lower substrates is not uniform. Thus, an electrical and optical blocking effect between adjacent cells is not achieved.

Besides the above printing method, a sand blasting method is used. The sand blasting method is however complicated, and the yield therefrom is very low.

On the other hand, a laser transcription method was developed for the printing, typesetting, and photographic fields thirty or more years ago. According to the laser transcription method, a transcription substance, e.g., dye or pigment, included in a layer formed on a base film as a support is transcribed on a receiving film (glass or polymer film) according to an intended film pattern (U.S. Pat. Nos. 3,787,210 and 5,326,619).

Referring to U.S. Pat. No. 3,787,210, a mixture of the transcription material such as dye and pigment and nitrocellulose decomposed by light is deposited on a base film. As a result, the pigment or dye can be transcribed on a substrate by the explosive force of gas generated from the nitrocellulose through the thermal decomposition.

However, since such transcription process consumes much energy, a more effective and stable transcription process is required. As a result, a donor film has been developed. Here, the structure of the donor film is dependent on the thickness and physical properties of the transcription substance and its energy source. The donor film has a structure in which a light absorption layer for providing transcription energy through a thermal decomposition reaction by absorbing light, and a transcription layer including a transcription substance are stacked on a film functioning as a support. Here, the light absorption layer having a thickness of about 1,000 Å absorbs light and transcribes the transcription substance using the explosive force of nitrogen or hydrogen gas generated during the thermal decomposition reaction.

The above laser transcription method will now be described in detail with reference to FIG. 4 schematically showing a transcription apparatus used in a general laser transcription method.

In FIG. 4, a high power laser beam is emitted from an energy source 41. As the energy source emitting power at a rate of 0.1~4 W, a high power solid laser such as Nd/YAG, gas laser such as $CO_2$ and CO, or a diode-coupled Nd/YAG can be used. The emitted laser beam is divided into a plurality of beams having the same intensity via a beam splitter 42. If the intensity of the beam is controlled by dividing the beam into a plurality of beams, a substance can be transcribed in a desired shape (U.S. Pat. No. 4,796,038).

The intensity of the plurality of divided laser beams is controlled by a modulator 43 according to an intended shape, and then the laser beam irradiates a donor film 46 on which the transcription substance is deposited, via a condensing optical system 44. Here, only the substance deposited on a light-receiving portion of the donor film is transcribed onto a substrate 47. The movement of a stage 48 is controlled together with a raster 49 for controlling the intensity of the bundle of the beam according to the shape of the desired pattern.

The inventors of the present invention have conducted research into a method for forming a flat-panel display device in which a cell gap between upper and lower substrates is uniformly maintained using the above-described transcription method, thereby improving the display characteristics of the flat-panel display device.

SUMMARY OF THE INVENTION

It is an object of the present invention to provide a flat-panel display device such as liquid crystal display (LCD) and a plasma display panel (PDP), in which a cell gap between upper and lower substrates is uniform, improving display characteristics.

It is another object of the present invention to provide a method for manufacturing the flat-panel display panel.

In one aspect of the present invention, there is provided a liquid crystal display including first and second substrates in which a transparent substrate, a transparent electrode and an alignment layer are sequentially stacked, and a liquid crystal layer of which thickness is uniformly maintained by spacers formed between the alignment layers of the first and second substrates, wherein the height of each spacer and the interval between two adjacent spacers are constant.

In another aspect of the present invention, there is provided a method for manufacturing a liquid crystal display, comprising the steps of: (a) forming first and second substrates in which transparent substrates, transparent electrodes and alignment layers are sequentially stacked, respectively; (b) placing a donor film including a base film, a light absorption layer and a transcription layer in a position depart from the alignment layer of the first substrate by a predetermined distance; (c) transcribing the spacer forming polymer of the transcription layer onto the first substrate by irradiating an energy source toward the base film of the donor film to form spacers, each spacer having equal height and the between two adjacent spacers being uniform; (d) stacking the second substrate on the first substrate on which spacers are transcribed so as to face the alignment layers of two substrates each other; and (e) sealing two substrates by hardening the spacers by providing light or heat to at least one of the first and second substrates to fix the spacers between the alignment layers of the first and second substrates.

In still another aspect of the present invention, there is provided a plasma display panel including a first substrate in which a transparent substrate, an address electrode and a dielectric layer are stacked in sequence, a second substrate in which a transparent electrode, a bus electrode and a dielectric layer are stacked in sequence, and barrier walls formed between the first and second substrates to separate the first and second substrates by a predetermined distance, wherein each barrier wall has uniform height and width.

In further aspect of the present invention, there is provided a method for manufacturing a plasma display panel comprising the steps of: (a) forming a first substrate in which a transparent substrate, an address electrode and a dielectric layer are stacked in sequence; (b) forming a second substrate in which a transparent substrate, a transparent electrode, a bus electrode and a dielectric layer are stacked in sequence; (c) placing a donor film including a base film, a light absorption layer and a transcription layer in a position separated from the dielectric layer of the first substrate by a predetermined distance; (d) transcribing a barrier wall forming material of the transcription layer on the first substrate by irradiating a light source on the base film of the donor film to form barrier walls, each barrier wall having uniform height and width; (e) stacking the second substrate on the first substrate so as to face the dielectric layers of two substrates each other.

BRIEF DESCRIPTION OF THE DRAWINGS

The above objects and advantages of the present invention will become more apparent by describing in detail a preferred embodiment with reference to the attached drawings in which.

DETAILED DESCRIPTION OF THE INVENTION

Hereinafter, the present invention will be described in detail with reference to the appended drawings, however, the present invention is not limited to the following.

Figure 1:
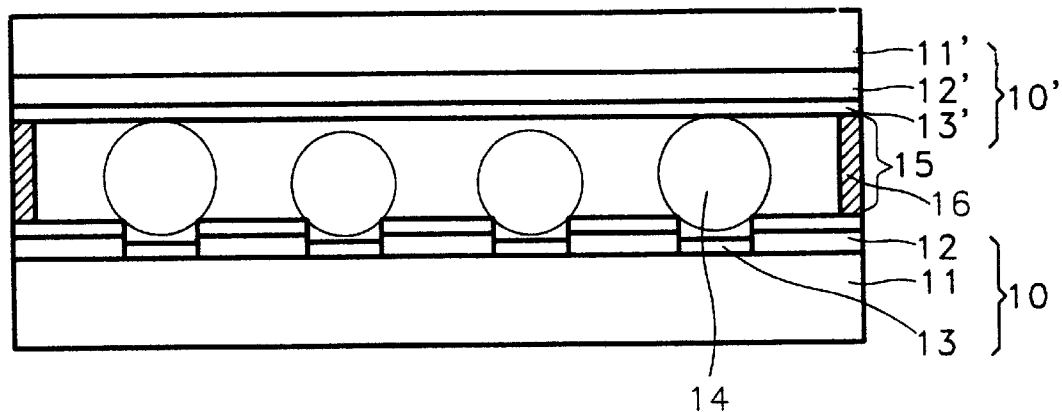
FIG. 1 is a sectional view of a conventional liquid crystal display (LCD)
Figure 2:
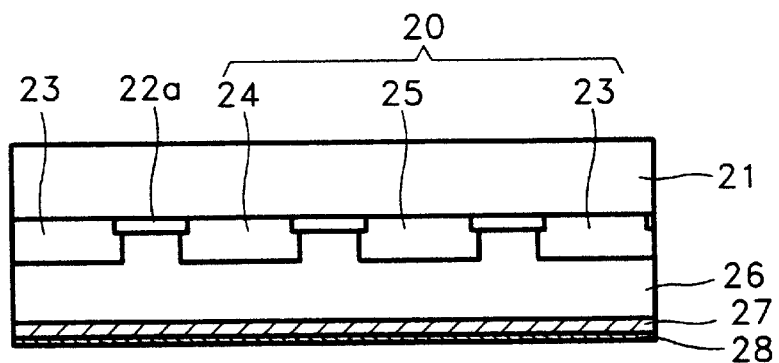
FIG. 2 is a sectional view showing a example of a color filter layer of a color LCD.
Figure 3:
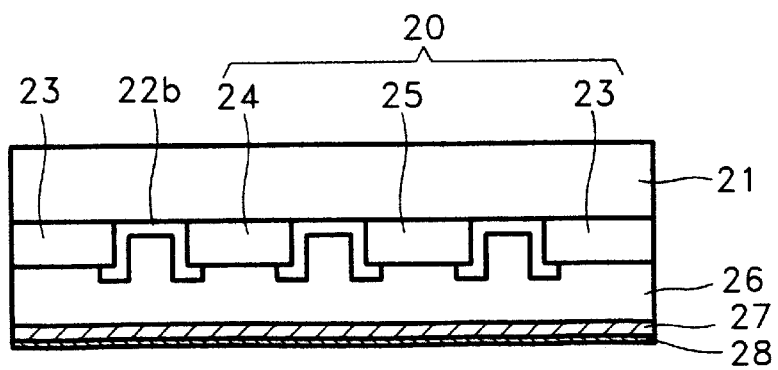
FIG. 3 is a sectional view showing another example of a color filter layer for the color LCD.
Figure 4:
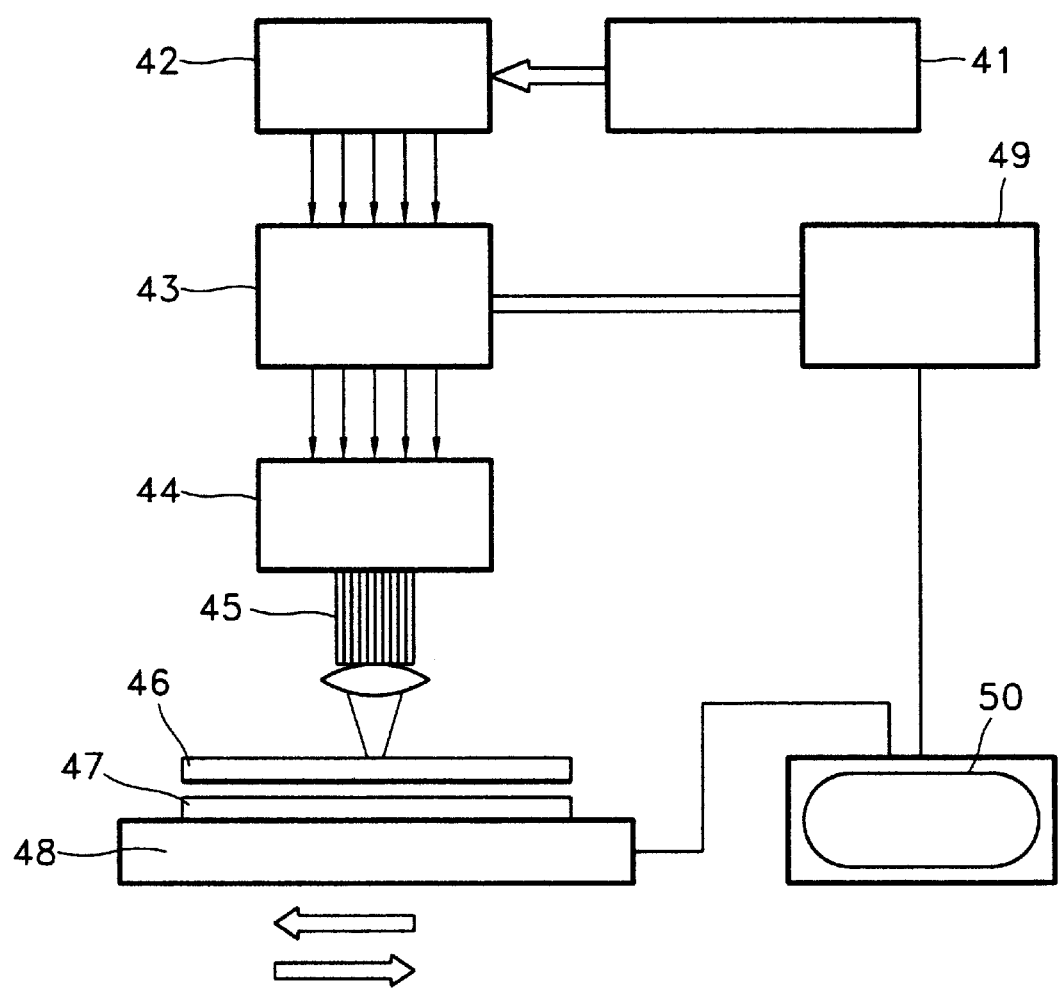
FIG. 4 is a diagram schematically showing an apparatus used for a laser transcription method.
Figure 5:
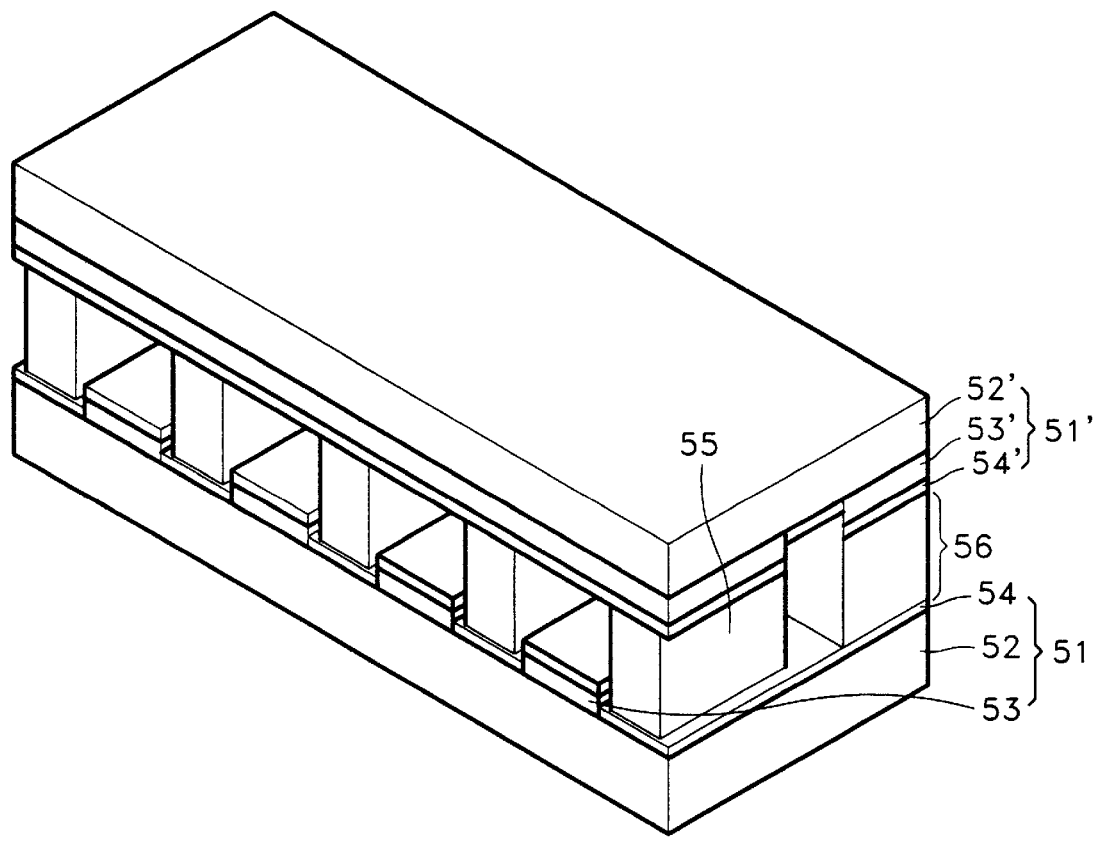
FIG. 5 is a perspective view of a LCD showing an embodiment of the present invention.

FIG. 5 shows one embodiment of a liquid crystal display (LCD) according to one aspect of the present invention. In FIG. 5, reference numerals 51 and 51' represent first and second substrates, reference numerals 52 and 52' represent transparent substrates, reference numerals 53 and 53' represent transparent electrodes, reference numerals 54 and 54' represent alignment layers, reference numeral 55 represents a spacer formed by transcription, and reference numeral 56 represents a liquid crystal layer, respectively.

As can be seen from FIG. 5, the spacers having a uniform height are formed at predetermined intervals.

The LCD shown in FIG. 5 is formed by the following steps.

First, two transparent substrates 52 and 52' are prepared, and the transparent electrodes 53 and 53' and the alignment layers 54 and 54' are sequentially stacked on each transparent substrate, to form the first and second substrates 51 and 51'. Then, a donor film (not shown) including a base film, a light absorption layer and a transcription layer is positioned separate from the alignment layer 54 of the first substrate 51 by a predetermined interval. Then, a light source irradiates the base film of the donor film to transcribe a spacer forming material of the transcription layer onto the first substrate. Then, the second substrate 51' is stacked on the first substrate 51 such that the alignment layers 54 and 54' of the first and second substrates 51 and 51' face each other. Then, two substrates are sealed by applying light or heat to one of the first and second substrates, thereby completing an LCD.

Figure 6:
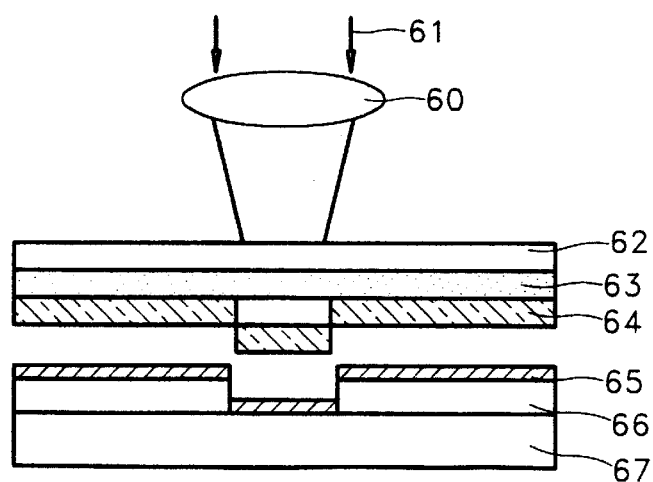
FIG. 6 is a diagram illustrating a method for transcribing a spacer forming material.

FIG. 6 is a diagram illustrating the step of transcribing the spacer forming material in detail.

First, a transparent substrate 67, a transparent electrode 66, and an alignment layer, 65 are sequentially stacked to form a first substrate. Next, for transcription, a light absorption layer 63 and a transcription layer 64 are sequentially deposited on a base film 62 to manufacture a donor film. Then, after facing the alignment layer 65 toward the transcription 64, a light source 61 is irradiated toward the base film 62. The irradiated energy activates the light absorption layer 63 via a laser transcription device 60 and the base film 62, so that transcription energy is emitted through the thermal decomposition reaction. By the explosive force of the transcription energy, the spacer forming material is transcribed onto the alignment layer.

As described above, the donor film has a structure in which the base film, light absorption layer and transcription layer are stacked in sequence.

In detail, preferably, the base film is formed of a material having light transmittance of 90% or more, such as polyethyleneterephthalate (PET) and polycarbonate.

The light absorption layer acts as a layer for converting the received light into transcription energy, and may include a polymer or a metallic material.

The transcription layer includes a spacer-forming polymer as a main component, an initiator, and a hardening agent. Thus, two substrates can be sealed by hardening the transcribed spacers by the following hardening step. That is, an extra substrate sealing step using a sealant is not necessary, so that the process is simplified. Here, the polymer may be selected from the group consisting of polyacryl, polyimide, polyvinylalcohol (PVA), polyvinylpyrrolidone (PVP), epoxy resin, phenol-formaldehyde resin, and an unsaturated polyester resin. Also, the initiator may be an organic substance having an unstable functional group such as azo (—N=N—), disulfide (—S—S—) and peroxide (—O—O—) groups. In detail, benzol peroxide may be used as an optical initiator, and benzophenon and imidazole may be used as a thermal initiator. The hardening agent may be anything which can be used in the field related with the present invention.

On the other hand, a buffering layer may be included between the light absorption layer and the transcription layer, which is for preventing unevenness of the transcription layer, caused by the energy transmitted from the light absorption layer, and the partial transcription of the transcription layer together with the light absorption layer.

Also, as a light source which can be used to transcribe the transcription layer, a UV/VIS (i.e., ultraviolet/visible) light source such as a laser beam, xenon or halogen lamp, or a thermal head may be used. The substrate may be sealed by hardening the spacers by providing light or heat energy from a proper light source. Here, the light or heat energy source used for hardening the spacers may be the same as that used for the transcription, preferably, a high-pressure mercury lamp, a xenon lamp, or a flash lamp.

In the LCD manufactured by the above-described manufacturing method, preferably, the height of each spacer is 0.5~10 μm, and the interval between adjacent spacers is 10~1,000 μm.

On the other hand, a color LCD may be manufactured by further forming a color filter layer consisting of color filters (red, green, and blue filters) on one of two substrates. If required, a protective film may be further formed on the color filter layer.

In this case, the spacers are formed in the liquid crystal layer corresponding to each portion between every pair of adjacent color filters, i.e., a portion in which black matrixes are to be formed, covering the region between adjacent color filters. Also, each spacer has an absorbency of 2 or more and a height of 0.5~10 μm.

Figure 7:
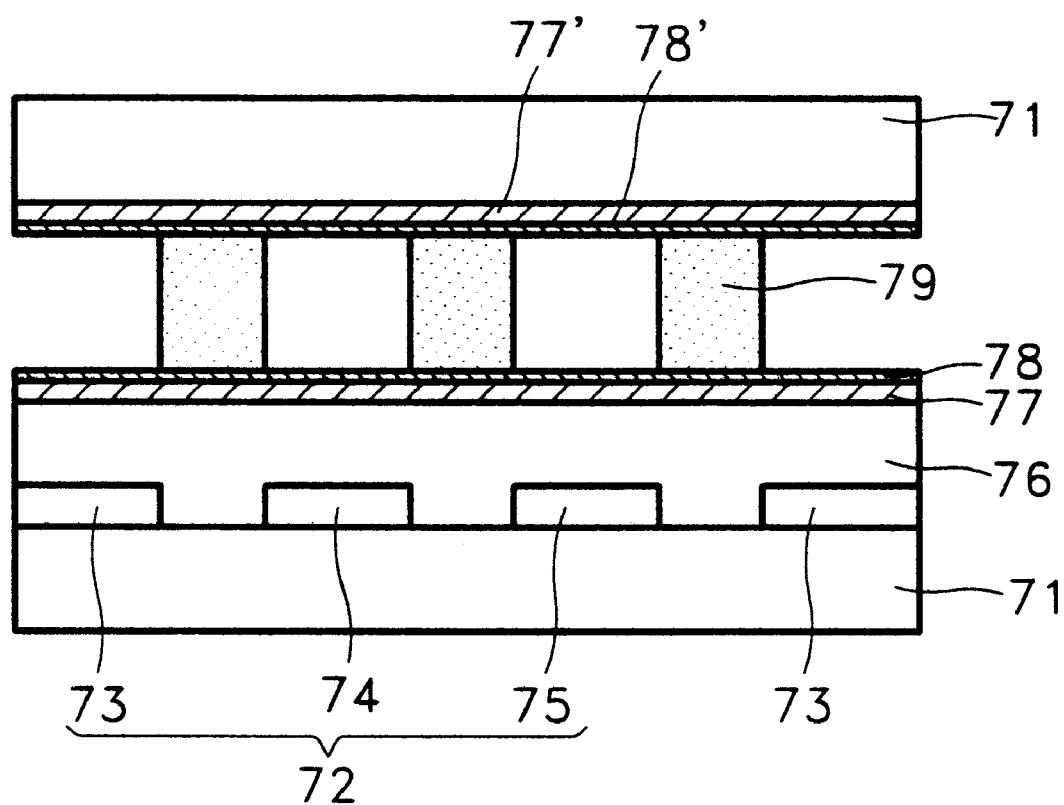
FIG. 7 is a sectional view of a LCD showing another embodiment of the present invention.

An LCD having the above structure is shown in FIG. 7.

In FIG. 7, reference numerals 71 and 71' represent transparent substrates, reference numeral 72 represents color filter layer, reference numerals 73, 74, and 75 represent red, green, and blue color filters, respectively, reference numeral 76 represents a protective film, reference numerals 77 and 77' represent transparent electrodes, reference numerals 78 and 78' represent alignment layers, and reference numeral 79 represents opaque spacers formed at positions where black matrixes are to be located, respectively.

As can be seen from FIG. 7, the opaque spacers are located in the positions where the black matrixes are to be formed such that the opaque spacers act as a black matrix as well. Thus, there is no need to form extra black matrixes. Also, the height of each opaque spacer is 0.5~10 μm which is larger than that (about 1,400 Å) of the conventional black matrix, so that enhanced prevention of mixing of colors and an improved high-luminance characteristic can be achieved.

A plasma display panel (PDP) according to the present invention is manufactured by the following method.

First, two transparent substrates are prepared. An address electrode and a dielectric layer are sequentially formed on the one of the transparent substrates, and a transparent electrode, a bus electrode, and a dielectric layer are sequentially formed on the other transparent substrate, thereby resulting in first and second substrates. Then, a donor film including a base film, a light absorption layer, and a transcription layer is formed separated from the dielectric layer of the first substrate by a predetermined distance. Then, a light source irradiates the donor film to transcribe a barrier wall forming material onto the first substrate, and the second substrate is stacked on the first substrate such that the dielectric layers of the first and second substrates face each other, thereby completing the PDP.

In the above manufacturing method for the PDP of the present invention, the donor film has a structure in which the base film, light absorption layer, and transcription layer are stacked in sequence.

In detail, the base film and light absorption layer are the same as those described in the method of manufacturing the LCD, and the transcription layer may include a barrier wall forming material, such as alumina ($Al_2O_3$) or glass powder.

Also, as described above, a buffering layer may be further included between the light absorption layer and the transcription layer.

On the other hand, the light source used for the transcription is the same as that described for the method of manufacturing the LCD.

Also, the method of manufacturing the PDP may further include the step of forming multilayered barrier walls by repeating the transcription steps several times before the second substrate is stacked on the first substrate. As a result, barrier walls having the intended height can be obtained.

In the PDP obtained by the above steps, preferably, the height and width of each barrier wall are 10~several hundreds μm and 20~300 μm, respectively.

The present invention provides the following advantages.

First, in the LCD, the spacer forming material having a predetermined height is transcribed at an intended position, so that the spacers do not agglomerate as in the conventional spacer deposition method, resulting in a cell gap of uniform interval. Also, two substrates are sealed by hardening the transcribed spacers, so that an additional substrate sealing process is not required. Also, there is no damage to the electrode by the spacers that occurs during the conventional substrate sealing process under heat and pressure. Also, the spacer forming material is hardened by light (or heat) and then fixed between two substrates, so that damage to the alignment layer during the injection of liquid crystals, caused by the flowing of spacers, is prevented.

In the case of the color LCD, opaque spacers function as a light shield like the conventional black matrix as well. Thus, an additional black matrix forming process is not required.

That is, in the method of manufacturing the LCD according to the present invention, mixing of colors between pixels is prevented, providing a high luminance characteristics through a simple manufacturing process.

As described above, the LCD and the manufacturing method therefor according to the present invention can be applied to manufacture FLCD, STN-LCD, TFT-LCD, TN-LCD, and plastic LCD.

In addition, in the case of the PDP, each barrier wall has a uniform height and width, and the electrical and optical blocking effect between adjacent cells, and resolution are remarkably enhanced, thereby improving the display quality of an image. Also, the manufacturing method for the PDP is simpler than the conventional method, and inferiority ratio is also low.

What is claimed is:

1. A method for manufacturing a plasma display panel comprising:
    (a) forming sequentially on a first transparent substrate, an address electrode and a dielectric layer;
    (b) forming sequentially on a second transparent substrate, a transparent electrode, a bus electrode, and a dielectric layer;
    (c) placing a donor film, including a base film, a light absorption layer, and a transcription layer, opposite and spaced from the first substrate and the dielectric layer; and
    (d) transcribing a barrier wall-forming material of the transcription layer onto the dielectric layer on the first substrate by irradiating the donor film with light to form barrier walls, the barrier walls having a uniform height and width; and
    (e) stacking the second substrate on the first substrate so the dielectric layers of two substrates face each other.

2. The method for manufacturing a plasma display panel as claimed in claim 1, wherein the barrier wall forming material is selected from the group consisting of alumina and glass powder.

3. The method for manufacturing a plasma display panel as claimed in claim 1, comprising forming multilayered barrier walls by repeating the step (c) several times, between the steps (c) and (d).

4. A method for manufacturing a plasma display panel as claimed in claim 1, wherein the light source used in the step (c) is at least one selected from the group consisting of laser beam, xenon lamp, halogen lamp and thermal head.

* * * * *